(12) United States Patent
Wilson et al.

(10) Patent No.: US 12,064,382 B2
(45) Date of Patent: Aug. 20, 2024

(54) ADJUSTABLE ANATOMICAL SUPPORT AND SEAT CUSHION APPARATUS FOR WHEELCHAIRS

(71) Applicant: SUPRACOR, INC, San Jose, CA (US)

(72) Inventors: Susan L. Wilson, San Jose, CA (US); Curtis L. Landi, San Jose, CA (US)

(73) Assignee: SUPRACOR, INC., San Jose, CA (US)

( * ) Notice: Subject to any disclaimer, the term of this patent is extended or adjusted under 35 U.S.C. 154(b) by 324 days.

(21) Appl. No.: 17/714,395

(22) Filed: Apr. 6, 2022

(65) Prior Publication Data

US 2022/0226174 A1 Jul. 21, 2022

Related U.S. Application Data

(63) Continuation-in-part of application No. 16/583,251, filed on Sep. 25, 2019, now Pat. No. 11,369,532.

(Continued)

(51) Int. Cl.
*A61G 5/10* (2006.01)
*B32B 3/04* (2006.01)
(Continued)

(52) U.S. Cl.
CPC .......... *A61G 5/1045* (2016.11); *A61G 5/1091* (2016.11); *B32B 3/04* (2013.01);
(Continued)

(58) Field of Classification Search
CPC ...... A61G 5/1045; A61G 5/1091; B32B 3/04; B32B 3/12; B32B 5/02; B32B 5/18;
(Continued)

(56) References Cited

U.S. PATENT DOCUMENTS 4,031,579 A 6/1977 Larned
4,143,916 A 3/1979 Trotman et al.
(Continued)

FOREIGN PATENT DOCUMENTS

AT 509326 A4 8/2011
JP H0677598 U 11/1994
(Continued)

OTHER PUBLICATIONS

Machine translation of AT 509326 A4.
(Continued)

*Primary Examiner* — Fredrick C Conley
(74) *Attorney, Agent, or Firm* — Klintworth & Rozenblat IP LLP

(57) ABSTRACT

An adjustable anatomical support and seat cushion apparatus for wheelchairs according to some embodiments of the disclosure includes a base member formed of at least one layer of a thermoplastic honeycomb material, a generally rectangular, resilient cushion member formed of upper, intermediate and lower layers of thermoplastic honeycomb material which are bonded together, and at least one pad removably insertable into a pocket in the lower layer. The base member is pivotally attached to the cushion member. The cushion member is rotatable between a non-parallel disposition and a parallel disposition relative to the base member. An open end of the pocket faces the base member when the cushion member is in the parallel disposition.

19 Claims, 8 Drawing Sheets

Related U.S. Application Data

(60) Provisional application No. 62/736,452, filed on Sep. 25, 2018.

(51) Int. Cl.

| | | |
|---|---|---|
| *B32B 3/12* | (2006.01) | |
| *B32B 5/02* | (2006.01) | |
| *B32B 5/18* | (2006.01) | |
| *B32B 7/022* | (2019.01) | |
| *B32B 25/00* | (2006.01) | |
| *B32B 27/30* | (2006.01) | |
| *B32B 27/40* | (2006.01) | |

(52) U.S. Cl.
CPC .............. *B32B 3/12* (2013.01); *B32B 5/02* (2013.01); *B32B 5/18* (2013.01); *B32B 7/022* (2019.01); *B32B 25/00* (2013.01); *B32B 27/306* (2013.01); *B32B 27/40* (2013.01); *B32B 2260/021* (2013.01); *B32B 2260/046* (2013.01); *B32B 2272/00* (2013.01); *B32B 2274/00* (2013.01); *B32B 2307/54* (2013.01); *B32B 2307/546* (2013.01); *B32B 2307/56* (2013.01); *B32B 2307/5825* (2013.01); *B32B 2479/00* (2013.01); *B32B 2535/00* (2013.01); *B32B 2605/08* (2013.01); *B32B 2605/18* (2013.01)

(58) Field of Classification Search
CPC ....... B32B 7/022; B32B 25/00; B32B 27/306; B32B 27/40; B32B 2260/021; B32B 2260/046; B32B 2272/00; B32B 2274/00; B32B 2307/54; B32B 2307/546; B32B 2307/56; B32B 2307/5825; B32B 2479/00; B32B 2535/00; B32B 2605/08; B32B 2605/18
See application file for complete search history.

(56) References Cited

U.S. PATENT DOCUMENTS

| | | |
|---|---|---|
| 4,522,447 A | 6/1985 | Snyder et al. |
| 5,039,567 A | 8/1991 | Landi et al. |
| 5,180,619 A | 1/1993 | Landi et al. |
| 5,203,607 A | 4/1993 | Landi |
| 5,378,045 A | 1/1995 | Siekman et al. |
| 5,390,384 A | 2/1995 | Dinsmoor, III et al. |
| 5,444,881 A | 8/1995 | Landi et al. |
| 5,513,899 A * | 5/1996 | Michaels ............. A47C 31/126 297/452.41 |
| 5,551,107 A | 9/1996 | Graebe |
| 5,617,595 A | 4/1997 | Landi et al. |
| 5,687,436 A | 11/1997 | Denton |
| 5,687,536 A | 11/1997 | Lin |
| 5,840,400 A | 11/1998 | Landi et al. |
| 6,142,563 A | 11/2000 | Townsend et al. |
| 6,269,504 B1 * | 8/2001 | Romano ................. A47C 27/22 5/653 |
| 6,901,617 B2 | 6/2005 | Sprouse, II et al. |
| 7,717,520 B2 | 5/2010 | Boren et al. |
| 7,871,039 B2 | 1/2011 | Fullerton et al. |
| 8,793,821 B2 | 8/2014 | Fowkes et al. |
| 9,532,912 B2 | 1/2017 | Loewenthal et al. |
| 9,708,067 B2 | 7/2017 | Wilson et al. |
| 2003/0061663 A1 | 4/2003 | Lampel |
| 2003/0205920 A1 | 11/2003 | Sprouse et al. |
| 2005/0231014 A1 | 10/2005 | Carlisle |
| 2009/0295203 A1 | 12/2009 | Lewis et al. |
| 2021/0205155 A9 | 7/2021 | Wilson et al. |

FOREIGN PATENT DOCUMENTS

| | | |
|---|---|---|
| JP | 2006006941 A | 1/2006 |
| JP | 2015181912 A | 10/2015 |
| WO | 2020201805 A3 | 10/2020 |

OTHER PUBLICATIONS

Extended European Search Report for European Patent Application No. 23166980.5, dated Jul. 28, 2023, 8 pages.

'Pressure Reducing chair Cusion—Comfort Cushion Seat Pad for Wheelchair, Arm Chair, Patio Chair—Machine Wash Polyester/Cotton—Navy Blue' (EasyComforts), Jul. 12, 2021, [online], previously retrieved from <URL: https://www.amazon.com/Pressure-Reducing-Cushion-for-Wheelchairs/dp/B078PXBFL2/ref=pd_lpo_121_t_2/130-7786592-9163630?_encoding=UTF8&pd_rd_r=5ad457ca-d3fa-4fcf-a5a7-6044f547583d&pd_rd_w=12epa&pd_rd_wg=hKgCQ&pf_rd_p=7b36d496-f366-4631-94d3-61b87b5s511b&pf_rd_r=EVST5XQ8ZHJPFHW7CCE6&refRID=EVST5XQ8ZHJPFHW7CCE6&th=1> and currently from <https://www.amazon.com/Pressure-Reducing-Cushion-for-Wheelchairs/dp/B078PXBFL2>, entire document.

International Preliminary Report on Patentability for International Patent Application No. PCT/IB2019/001463 dated Apr. 16, 2021, 39 pages.

International Search Report for International Patent Application No. PCT/IB2019/001463 dated Oct. 16, 2020, 2 pages.

International Written Opinion for International Patent Application No. PCT/IB2019/001463 dated Oct. 16, 2020, 4 pages.

* cited by examiner

OPTIMAL POSTURE

PELVIC OBLIQUITY

ANTERIOR PELVIC TILT

POSTERIOR PELVIC TILT

PELVIC ROTATION

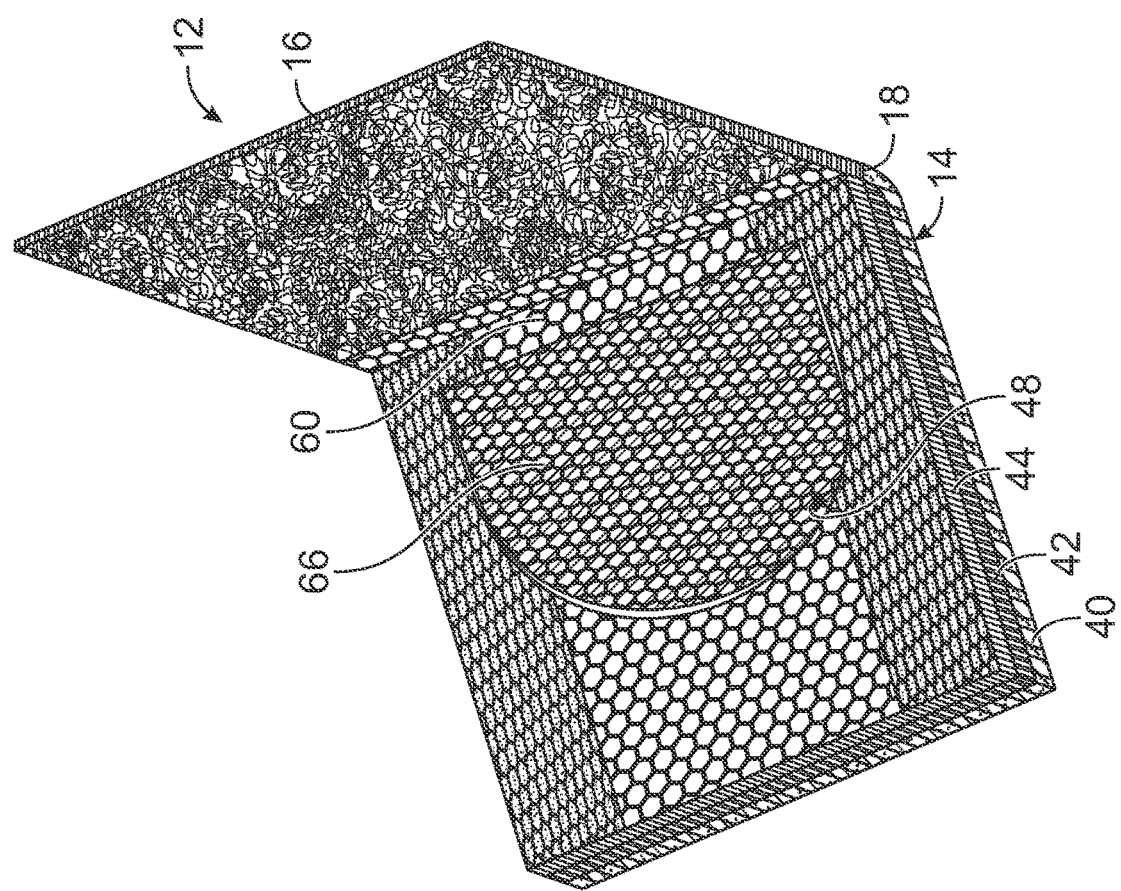

ADJUSTABLE ANATOMICAL SUPPORT AND SEAT CUSHION APPARATUS FOR WHEELCHAIRS

CROSS-REFERENCE TO RELATED APPLICATION(S)

This application is a continuation-in-part application of U.S. patent application Ser. No. 16/583,251, filed on Sep. 25, 2019, and claims the domestic benefit of 62/736,452, filed on Sep. 25, 2018, the contents of which are incorporated herein in its entirety.

FIELD OF THE DISCLOSURE

The present disclosure relates generally to anatomical support cushions adapted for use in improving pelvic and spinal alignment issues during use of a wheelchair apparatus.

BACKGROUND

Non-ambulatory patients suffering with minor illness or simple leg bone injuries, or the like, do not normally require the use of special purpose wheelchair cushions. However, in those long term care (LTC) cases where the patient suffers from serious postural injury or physical conditions involving pelvic or spinal related abnormalities expressing pelvic obliquity issues, anterior pelvic tilt issues, posterior and/or pelvic tilt issues, or pelvic rotation issues, the use of specially configured cushioning or other body positioning, orienting or supporting means may be required. The present disclosure is intended to address this need and to provide an adjustable wheelchair cushion that can be specified, prescribed and/or used by LTC therapists to improve the efficacy of wheelchair cushioning used in this environment.

The following is included to provide background information relating to some of the postural abnormalities toward which the present disclosure is directed, and how an LTC therapist has sought to provide, or has in fact provided, patient relief during use of a standard wheelchair and cushioning means.

Terms Used Herein

LTC: Long Term Care

Lordosis: an abnormal forward curvature of the spine in the lumbar region, resulting in a swaybacked posture.

Kyphosis: an abnormal, convex curvature of the spine, with a resultant bulge at the upper back. Scoliosis: an abnormal lateral curvature of the spine.

Oblique: neither perpendicular nor parallel to a given line or surface; slanting; sloping. (of a solid) not having the axis perpendicular to the plane of the base. diverging from a given straight line or course.

Obliquity: the state of being oblique. Cervical: of or relating to the cervix or neck. Lumbar: of or relating to the loin or loins.

Loin: the part or parts of the human body or of quadruped animal on either side of the spinal column, between the false ribs and hipbone. Thorax: the part of the trunk in humans and higher vertebrates between the neck and the abdomen, containing the cavity, enclosed by the ribs, sternum, and certain vertebrae, in which the heart, lungs, etc., are situated; chest. Spine: the spinal or vertebral column; backbone.

Sacrum: a bone resulting from the fusion of two or more vertebrae between the lumbar and the coccygeal regions, in humans being composed usually of five fused vertebrae and forming the posterior wall of the pelvis. ELR: Elevating Leg rest STFH: Seat-to-Floor Height MWC: Manual Wheelchair IT: Ischial Tuberosity PSIS: Posterior Superior Iliac Spine ASIS: Anterior Superior Iliac Spine LE: Lower Extremity UE: Upper Extremity ROM: Range of Motion ADLs: Activities of Daily Living PPT: Posterior Pelvic Tilt OPTIMAL POSTURE—generally depicted in FIG. 2 of the Drawings Pelvis in midline.

ASIS & PSIS at equal height: no pelvic tilt.

L ASIS & R ASIS at equal height: no obliquity. L ASIS & R ASIS at equal depth: no rotation.

Spine balanced and upright, no rotation, no lateral curvature.

Normal lordosis in cervical and lumbar spine and normal kyphosis in thoracic spine creating the desired "S" shape. The head is functionally upright with only mild forward/lateral flexion or rotation.

PELVIC OBLIQUITY—generally depicted in FIG. 3 of the Drawings

In patients with this abnormality, the pelvis sits with the L or R ASIS higher than the other, causing the raising up of one hip. When one side of the pelvis is raised higher than the other, the thoracic spine curves away from the higher side creating a scoliosis over time. The neck will go into lateral flexion as if the person is dropping the ear to his or her shoulder. The lateral flexion will usually be towards the side where the hip is higher. Pressure redistribution is the therapist's support goal whether the deformity is FIXED or FLEXIBLE.

If FLEXIBLE: level the pelvis by building up the lower side.

If FIXED: accommodate for the deformity. Protect the bony prominences from pressure by "filling in" the higher side and immersing the lower side IT.

ANTERIOR PELVIC TILT-generally depicted in FIG. 4 of the Drawings

In patients with this abnormality, the pelvis sits with ASIS higher than the PSIS resulting in the posterior pelvic tilt which produces the sacral sitting posture. With excessive thoracic lordosis of the lumbar and cervical spine the patient hyperextends his or her back over the sling back of the chair, placing him or her at risk to tip the chair backwards.

Excessive lordosis of cervical spine causes hyperextension of the neck and upward eye gaze. With this abnormality, the goal is normally to utilize a cushion and back support that maximizes contact with the seat surface for optimal pelvic and spinal stability and pressure redistribution. Stability is the goal, so a back support is normally used that is tall enough for the patient.

Measurements are made from seat surface to the top of shoulder. A moldable back support to conform to the curvature of the spine is normally used.

POSTERIOR PELVIC TILT—generally depicted in FIG. 5 of the Drawings

With this abnormality, the pelvis sits with ASIS higher than the PSIS resulting in the posterior pelvic tilt which produces the sacral sitting posture. Excessive thoracic kyphosis, producing "C" shape spine, "flattening out" of the lordosis of the cervical spine and "flattening out" of the lordosis of the lumbar spine.

Decreased lordosis in cervical spine, causing forward neck flexion & downward eye gaze to floor/lap. A cushion with medial and lateral contour is often used to promote LE alignment and pelvic stability. Appropriate cushion depth should be used to prevent the patient from sliding forward as he seeks reduced pressure behind the knees. A rigid insert is often used to prevent hammocking of the seat and cushion and to keep the pelvis from collapsing into a posterior pelvic tilt.

If FLEXIBLE: A cushion with tapered adductors can be used to load the trochanters, stabilizing the pelvis in the resident's most neutral alignment.

If FLEXIBLE: A cushion with an anti-thrust component can be used to reduce forward sliding of the pelvis into posterior pelvic tilt.

If FIXED: An immersion style cushion that contours to the shape of the patient can be used to promote maximum pressure redistribution, minimizing peak pressures.

If FIXED: Opening seat-to-back angle in conjunction with a fixed tilt in the wheelchair, is often used to match the patient's ROM limitations and minimize forward sliding.

SUMMARY

Briefly stated, the present disclosure is directed to an adjustable, anatomical support and wheelchair seat cushion apparatus including a base member formed of at least one layer of a thermoplastic honeycomb material, a resilient cushion member formed of upper, intermediate and lower layers of thermoplastic honeycomb material which are bonded together, and at least one pad removably insertable into a pocket in the lower layer. The base member is pivotally attached to the cushion member. The cushion member is rotatable between a non-parallel disposition and a parallel disposition relative to the base member. An open end of the pocket faces the base member when the cushion member is in the parallel disposition.

The present disclosure is further directed to an adjustable, anatomical support and wheelchair seat cushion apparatus including a resilient thermoplastic honeycomb seat cushion member and a pivotally attached base member forming a planar base upon which the seat cushion member will rest be deformed when folded about the pivot to engage and lay thereupon. The base member may also be made of one or more layers of a more rigid thermoplastic honeycomb material. Positioned upon the base member and disposed between it and the overlying seat cushion member are user and/or LTC therapist installable, prescriptively sized and shaped pelvic obliquity elements, pommel elements and/or wedge elements, or the like, operative to deform the cushion member when engaged therewith.

Once the pads and/or obliquity, pommel and/or wedge elements are positioned and affixed to the base member, the cushion member is rotated into engagement with the base member. The obliquity, pommel and/or wedge elements deform the cushion member. The assembly is inserted into its fabric cover, a closing zipper or the like is retracted and the cushion apparatus is ready for use. The pad is provided in the back-center portion of the cushion member to protect the user's ischial bone.

An important advantage of the present disclosure is that the thermoplastic elastomeric honeycomb material used in the construction of the apparatus is an anisotropic material having improved pressure relief, stability, compression set resistance, durability and low maintenance characteristics.

Another advantage of the present disclosure is that in fitting the cushion apparatus for a particular user, an LTC therapist may select from a wide variety of preformed shaping elements and cushion positions therefor to customize and individually tailor the cushion apparatus for the user.

Yet another advantage of the present disclosure is that a single size and shape of cushion can be matched with a variety of individually selectable, preformed shaping elements to support the specific requirements of a particular wheelchair user.

Still another advantage of the present disclosure is that the anatomical support apparatus may be constructed from a perforated core thermoplastic elastomer honeycomb panel that is breathable to allow perspiration removal and cooling of the apparatus user.

Another advantage of the present disclosure is that different thermoplastic elastomeric honeycomb core designs and/or multiple panels of different thermoplastic honeycomb core designs may be utilized to maximize design flexibility of the improved anatomical support apparatus.

Still another advantage of the present disclosure is that the thermoplastic elastomeric honeycomb core is fabricated from recyclable materials that are fast drying, and easily disinfected and sterilized.

An object of the present disclosure is to provide an adjustable anatomical support and seat cushion apparatus that can be adapted to accommodate the particular anatomical support needs of a user/patient having postural abnormalities.

Another object of the present disclosure is to provide an improved anatomical support and seat cushion apparatus including at least one thermoplastic elastomer honeycomb cushion panel and a plurality of selectable inserts that serve to conform, support and/or stabilize a wide variety of wheelchair user sitting positions, user anatomies and disabilities.

Another object of the present disclosure is to provide an improved adjustable anatomical support cushion apparatus for providing pelvic and trunk stability for a wheelchair user having postural abnormalities.

Still another object of the present disclosure is to provide an adjustable anatomical support cushion apparatus for maximizing functional activities of daily living for a wheelchair user having postural abnormalities.

Yet another object of the present disclosure is to provide an improved anatomical support cushion apparatus for protecting skin and preventing wounds, and/or promoting the healing of existing wounds suffered by a wheelchair user having postural abnormalities.

A further object of the present disclosure is to provide an adjustable support cushion apparatus for maximizing comfort for a wheelchair user having postural abnormalities.

Another object of the present disclosure is to provide an adjustable anatomical support and seat cushion apparatus for minimizing unwanted skeletal movement by a wheelchair user having postural abnormalities.

Yet another object of the present disclosure is to provide an adjustable support cushion for preventing progression of postural abnormalities.

A still further object of the present disclosure is to provide an adjustable anatomical support apparatus that is breathable to permit cooling of the user.

Another object of the present disclosure is to provide an adjustable anatomical support and seat cushion apparatus that can be tailored to create certain desired cushioning and stabilizing characteristics without having to introduce padding elements such as foams, fluids or other means which add cost or reduce durability.

Still another object of the present disclosure is to provide an adjustable anatomical support apparatus constructed of materials that are fast-drying, and can be easily disinfected and sterilized by chemical wash, microwave treatment, detergent wash, or other means.

These and other objects and advantages of the present disclosure will no doubt become apparent to those skilled in the art after having read the following detailed description of the preferred embodiments which are contained in and illustrated by the various drawing figures.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which:

FIG. 20 is a perspective view of the user supporting cushion member and the pivotally attached base member of FIG. 18, with one of the ischial pads attached thereto.

DETAILED DESCRIPTION

Figure 1:
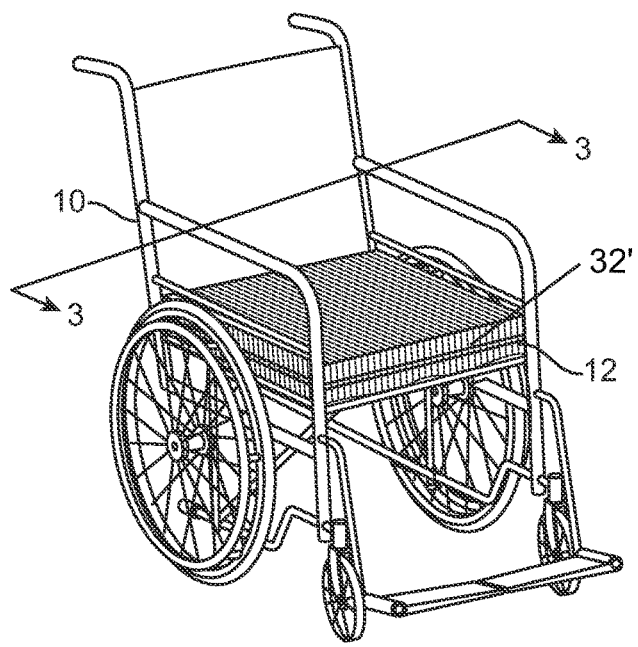
FIG. 1 is a perspective view generally illustrating a standard wheelchair having disposed thereon an improved anatomical support and seat cushion apparatus constructed in accordance with a presently preferred embodiment of the present disclosure.

Referring now to FIG. 1 of the Drawings which, as pointed out above, depicts a conventional wheelchair 10 having disposed thereon but shown without deformation, an adjustable, removable, improved anatomical support cushion assembly 12 enclosed in its fabric cover 30. As will be described in greater detail below, the cushion assembly 12 is constructed of at least one flexible thermoplastic elastomer honeycomb core panel built in accordance with the present disclosure. It should also be noted that although the cushion apparatus is particularly well suited for wheelchair applications, the cushion apparatus, or analogs thereof, may also be used in a variety of other anatomical support applications (e.g., mattresses, automobile and airline seats, arm rests, etc.).

Figure 2:
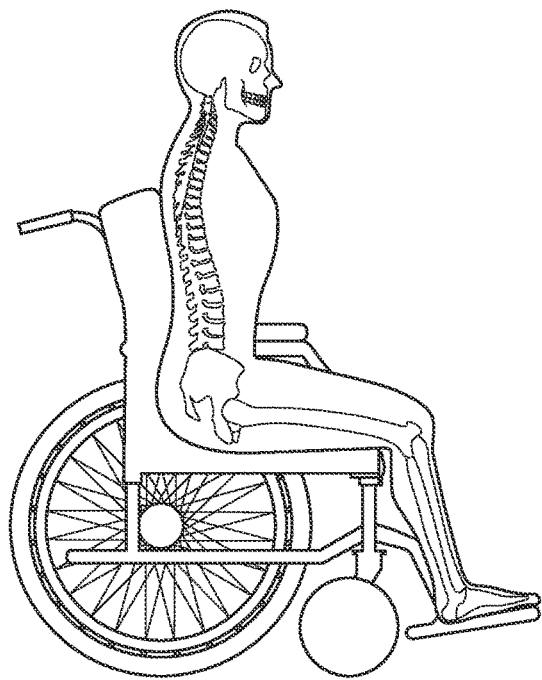
FIG. 2 is a stylized side elevational view illustrating an optimally postured patient sitting upright in a standard wheelchair of the type shown in FIG. 1.
Figure 3:
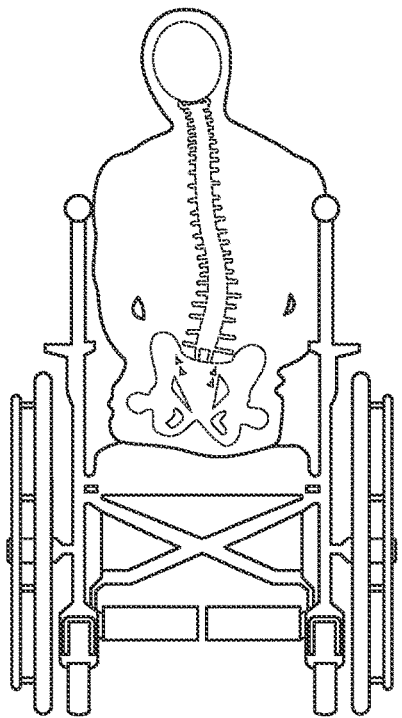
FIG. 3 is a stylized partial cross-sectional view taken along the line 3-3 of the wheelchair illustrated in FIG. 1, and a patient expressing pelvic obliquity abnormality to illustrate one example of a condition that can be addressed using an anatomical support and cushion apparatus in accordance with the present disclosure.
Figure 4:
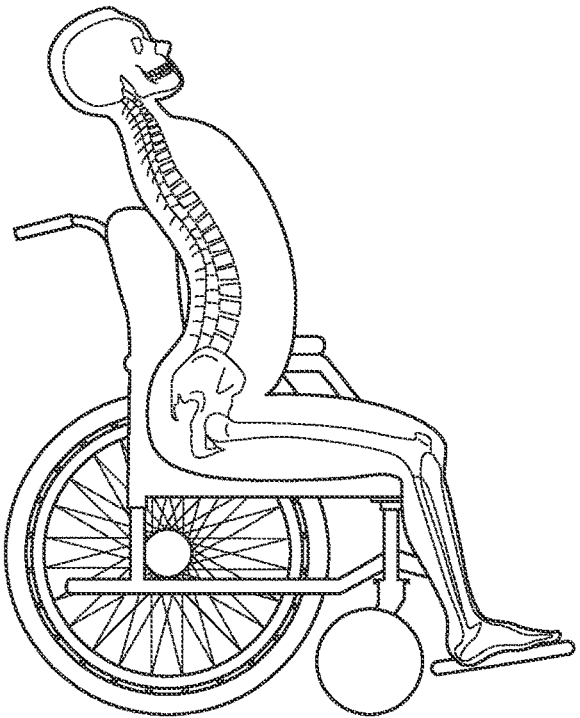
FIG. 4 is a stylized side elevational view illustrating a patient sitting in a standard wheelchair of the type shown in FIG. 1 and expressing an anterior pelvic tilt abnormality to illustrate another example of a condition that can be addressed using a cushion apparatus in accordance with the present disclosure.
Figure 5:
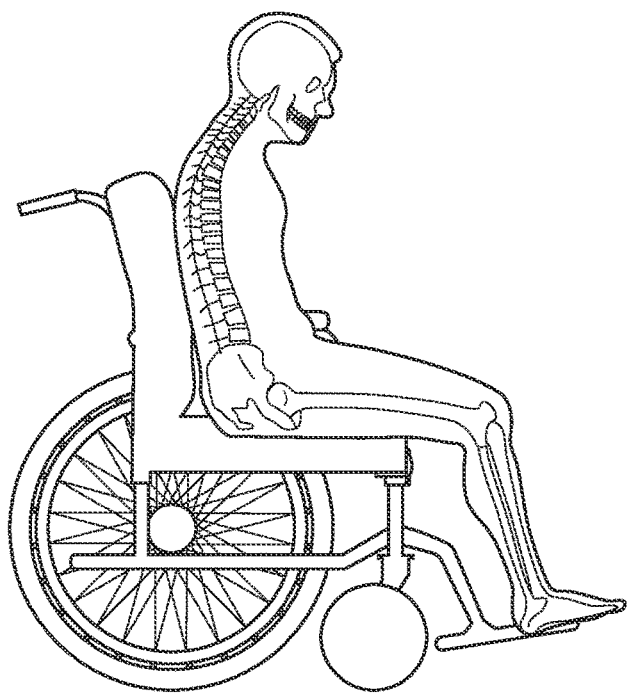
FIG. 5 is a stylized side elevational view illustrating a patient sitting in a standard wheelchair of the type shown in FIG. 1 and expressing a posterior pelvic tilt abnormality to illustrate another example of a condition that can be addressed using a cushion apparatus in accordance with the present disclosure.
Figure 6:
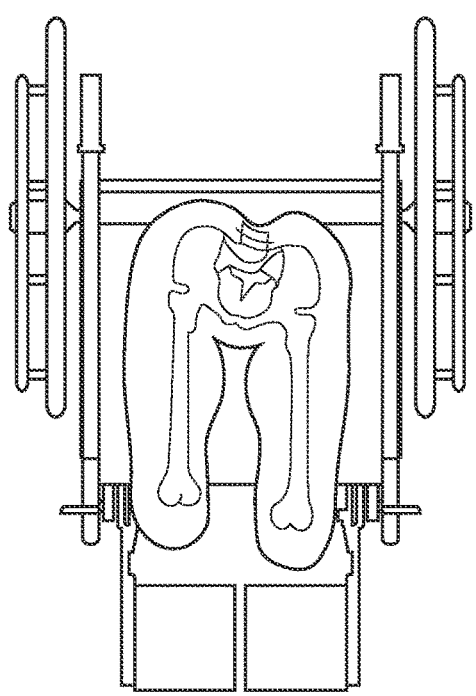
FIG. 6 is a partially broken plan view illustrating a patient sitting in a standard wheelchair of the type shown in FIG. 1 and expressing a pelvic rotation abnormality to illustrate another example of a condition that can be addressed using a cushion apparatus in accordance with the present disclosure.

FIG. 2 is provided to illustrate optimal user posture when seated in a standard wheelchair.

FIGS. 3-6 are provided to respectively illustrate abnormal postural conditions identified as pelvic obliquity, anterior pelvic tilt, posterior pelvic tilt and pelvic rotation; all of which are conditions that can be aided through use of the present disclosure.

Figure 7:
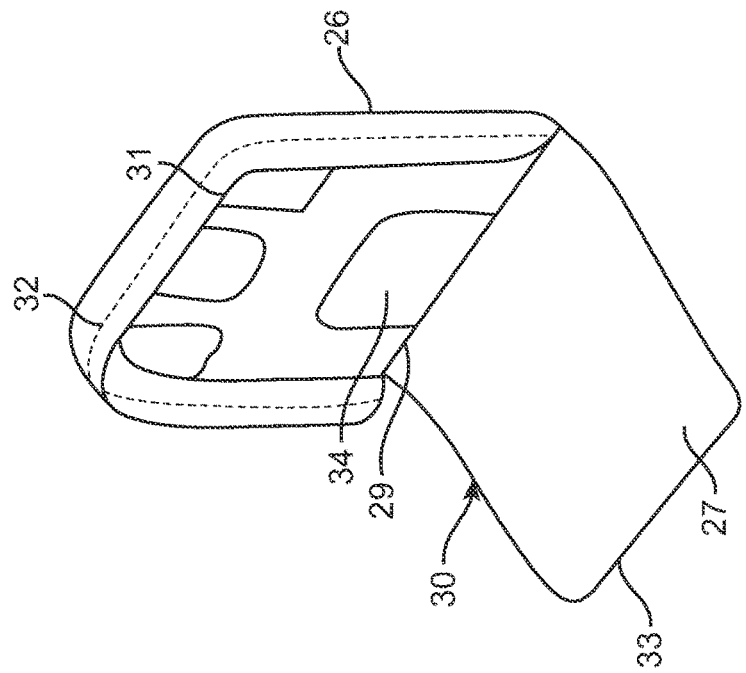
FIG. 7 is a stylized three-quarter view generally illustrating an adjustable anatomical support and cushion assembly, in its open configuration; the user supporting cushion member, the pivotally attached base member, and an assortment of obliquity elements, pommel elements and wedge elements all being disposed on the base member in accordance with an embodiment of the present disclosure.

FIG. 7 generally depicts the principal components of the seat cushion assembly 12 which can be used in a wheelchair in accordance with an embodiment of the present disclosure, and including a multi-layered resilient thermoplastic honeycomb cushion member 14 and a pivotally attached base member 16 (populated with cushion deforming elements 20, 24 and 26) forming a planar base upon which the upper cushion member 14 will rest when folded about a pivot or hinge means 18 to engage and lay upon the top of the cushion member 14 and one or more deforming elements 20, 22 and 24. Pivot means 18 is preferably a thermo-compressively formed bead-line disposed along mating rear edges 15 and 17 of the upper cushion member 14 and the base member 16, respectively. The base member 16 is preferably made of one or more layers of a more rigid thermoplastic honeycomb material.

Figure 8:
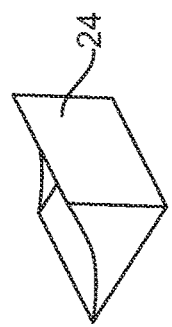
FIGS. 8-10 illustrate in 3-dimentional perspective, generalized examples of the obliquity elements, pommel elements, and wedge elements depicted in FIG. 7.
Figure 9:
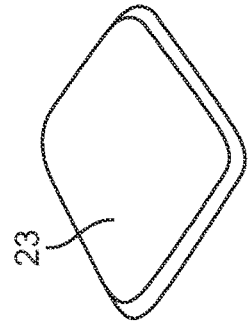
Figure 10:
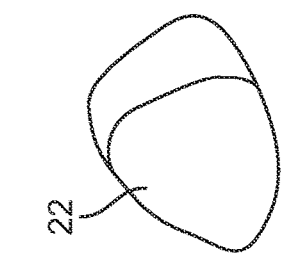

Positioned upon the base member 16 and disposed between it and the overlying cushion member 14 are user and/or LTC therapist installable, variously sized and shaped pelvic obliquity elements 20 (FIG. 8), pommel elements 22 (FIG. 9) and/or wedge elements 24 (FIG. 10) all of which are specifically shaped and sized, cushion deforming elements (perhaps prescriptively sized and shaped by an LTC therapist to address a particular user's condition), and intended to be operative to deform or adjust the support capability of the cushion member 14 in certain ways when it is engaged therewith. As suggested by the dashed lines 25 shown in FIG. 7, additional pockets may also be provided in cushion member 14 for receiving other cushion adjusting elements (not shown) that may also be inserted into the pockets to further deform the cushion member 14 to satisfy certain special needs of a user/patient.

Figure 12:
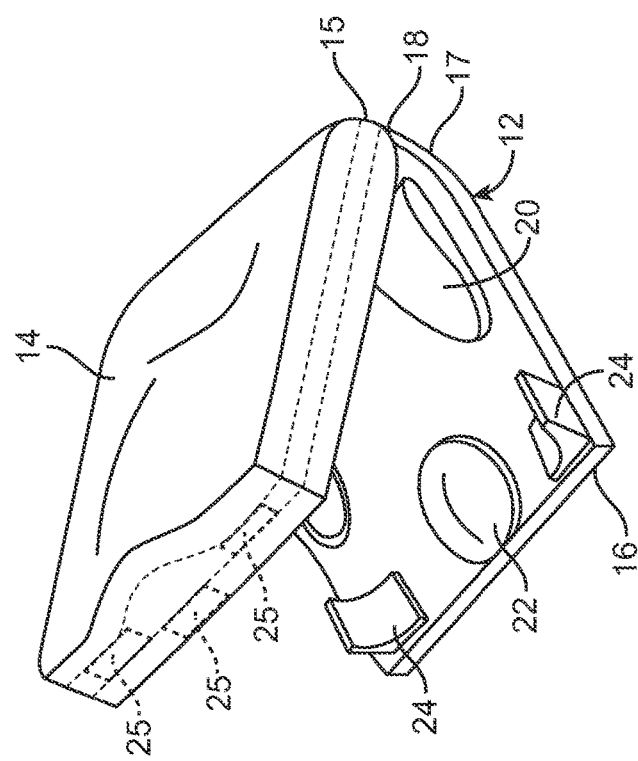
FIG. 12 is a stylized three-quarter perspective view generally illustrating, in its open configuration, a zippered cover envelope for receiving and containing the cushion assembly illustrated in FIG. 7.

Once the obliquity, pommel and/or wedge elements, or the like, are positioned on and affixed to the base member 16, (and perhaps other elements inserted into the pockets 25), the cushion member 14 may be rotated downwardly about the pivot or hinge means 18 into engagement therewith and deformed thereby, and the assembly is then ready for insertion into its protective cover 30 depicted in FIG. 12. It should be noted that the cushion "deformation" may be more or less visible depending upon the softness or resiliency of the cushion and the degree of anatomical adjustment required by the user.

The cover 30 is preferably made of a suitable fabric material and may include an upper shell-like part 26 and a mating bottom flap part 27. Once the cushion assembly 12 is fully assembled, it may be placed on the bottom flap part 27 of cover 30 and the upper shell-like part 26 can be rotated about its fold line 29 and into its closed position partially enveloping the cushion assembly 12. Closure of the cover 30 may then be completed by zipping an upper zipper part 31, disposed around the lower edge of the shell-like part 26, into engagement with a lower zipper part 33 disposed around the exposed perimeter of the bottom flap part 27. At this point the fully assembled cushion apparatus is ready to be placed upon the user/patient's wheelchair for use.

Figure 11:
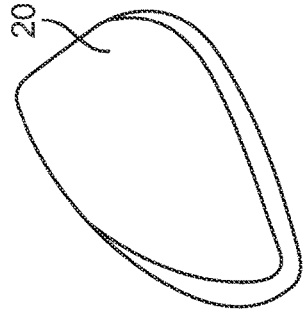
FIG. 11 is a perspective view generally illustrating an ischial pad of a configuration that might be installed in an appropriate location on the cushion assembly or in a pocket formed in its cover.

In some cases, use of an ischial pad 23 (preferably embodied in the form of another small honeycomb pad of a particular softness, or stiffness, and generally depicted in FIG. 11) may also be required to protect the user/patient's tailbone (ischial bone). To provide such protection, a suitably configured ischial pad 23 may be inserted into a pocket 34 provided in the back-center portion of the upper shell part 26 of cover 30 to protect the user/patient's ischial bone.

Note also that a second zipper facility 32, or the like, may be provided in cover 30 for permitting adjustment of the cover size (expanding or contracting) required to accommodate the number and/or size of the various deforming elements used in the cushion assembly.

Figure 13:
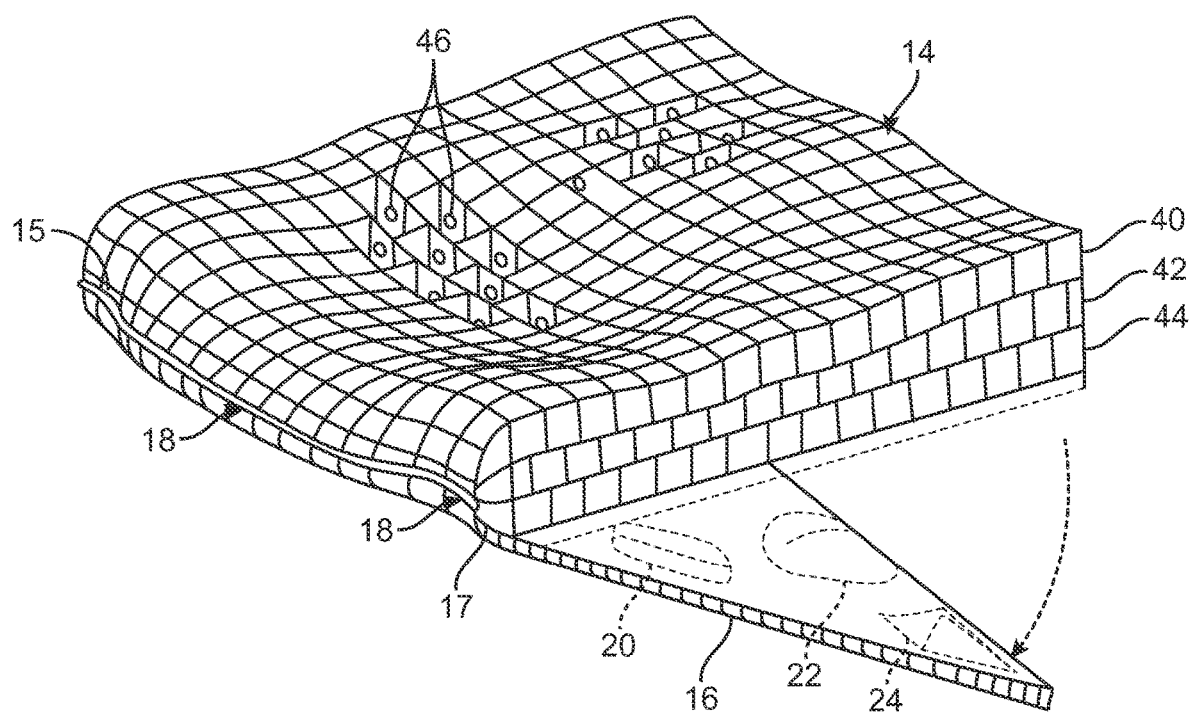
FIG. 13 is a stylized three-quarter perspective view, generally illustrating, in its open configuration, as viewed from the upper back side and opposite from that depicted in FIG. 7, of the user supporting cushion member and the pivotally attached base member, in accordance with an embodiment of the present disclosure.

In FIG. 13 a multi-layered cushion member, such as that disclosed in Applicant's prior U.S. Pat. No. 5,617,595 and fully incorporated herein by reference, is shown at 14. In accordance with the present disclosure, the cushion member 14 is shown modified to include a lower flap or base member 16 as described above. This example is provided to more clearly illustrate attachment of the flap edge 17 by thermo-compression bonding along the rear side of the cushion member. Alternatively, the flap edge may be otherwise attached to the upper cushion member 14.

FIG. 13 illustrates in more detail a particular embodiment of the adjustable wheelchair seat cushion assembly 12 having a multi-layered honeycomb seat cushion 14. The multi-layered honeycomb seat cushion 14 is constructed using multiple panels or layers of thermoplastic elastomer honeycomb materials. In this embodiment, the upper cushion member 14 is comprised of three layers or panels, 40, 42, 44 which are bonded together. Each panel 40, 42, 44 includes a honeycomb-like core preferably made of bonded together and expanded strips or ribbons of plastic material to which facing sheets of perhaps heavier gauge material are thermo-compression bonded. The illustrated cushion member 14 is an anisotropic three-dimensional structure having predetermined degrees of flex along the X, Y and Z axes. Each cell is formed, in part, by four generally S-shaped wall segments of the strips or ribbons each of which is bonded to adjacent strips and shared by an adjacent cell. In addition, each cell shares a double thickness wall segment with two adjacent cells. Note also that as described in our incorporated prior patents, at least some of the strips and facing sheets may be perforated, as shown at 46, to render the cushion breathable and to allow perspiration removal and cooling of the user's body. Moreover, the thermoplastic elastomeric honeycomb materials from which the cushion is fabricated may be recyclable, fast drying, and easily disinfected and sterilized.

Cushion member 14 has high tear and tensile strength and is highly resilient, with optimal compression load and shock absorption or distortion characteristics, yet is extremely light weight. Selected combinations of elastomer material, honeycomb cell configurations, core thicknesses and facing material variables will determine the panel's characteristics of softness or hardness, resilient recovery rate and rigidity or flex as required for a particular application. The facing materials can be selected from a wide variety of films, including thermoplastic urethanes, foams, EVAs, rubber, neoprene, elastomer impregnated fibers and various fabrics, etc. The manufacture and fabrication of honeycomb cushions of the type utilized in the present disclosure to make a cushion of the type embodied in applicant's cushion member 14 is described in our prior U.S. Pat. No. 5,039,567; the disclosure thereof being expressly incorporated herein by reference.

In accordance with the present disclosure, and as generally described above, the base member 16 is preferably made of at least one relatively thin sheet of more rigid honeycomb material, and has a rear edge 17 thereof hingedly connected to the back of the cushion member 14, preferably along its rearmost extremity. Removably disposed between the base member 16 and the cushion member 14, and preferably attached, by suitable means, such as Velcro or other "hoop and loop materials" or the like, to an upper surface of the base member 16 having at predefined locations, are one or more cushion deforming elements selected to define the user support characteristics of the cushion assembly. The cushion deforming elements may be generally described as an assortment of prescriptively sized and shaped pelvic obliquity elements 20, pommel elements 22 and/or wedge elements 24 as illustrated herein in FIGS. 8-10.

These elements are selected, positioned and secured by the user and/or assisting therapist or clinician on the upwardly facing base member surface so as to deform, or alter the support characteristics of the overlying resilient cushion member 14 to raise, lower, align, orient or otherwise adjust the user's skeletal components supported by the cushion assembly to provide pelvic and trunk stability, maximize the user's comfort and function during ADLs, protect the user's skin and prevent wounds, assist in the healing of existing wounds, minimize unwanted movement of the user on the cushion surface, correct or accommodate postural abnormalities and/or prevent or mediate progression of postural abnormalities.

As generally described below, these elements are adapted to deform the cushion member 14 as it is lowered (folded down) into supporting engagement therewith. The preformed obliquity elements 20, pommel elements 22 and/or wedge elements 24 are carefully selected and positioned to provide a desired customizing deformation or adjustment of the overlying cushion member 14 so that the cushion in turn provides the supporting needs of the user when the assembly is folded into its closed, or folded, configuration.

Once folded, the cushion assembly 12 is inserted into an enveloping fabric cover 30, such as that generally illustrated in FIG. 12, that is configured to conform to the shape of the cushion assembly and is provided with perimeter zippering means, or the like, to securely house the cushion assembly and maintain it in its closed and functional configuration. As pointed out above, the cover 30 may also be provided with internal and/or external pockets for receiving additional ischial pads, pommels or wedges, etc.

Figure 14:
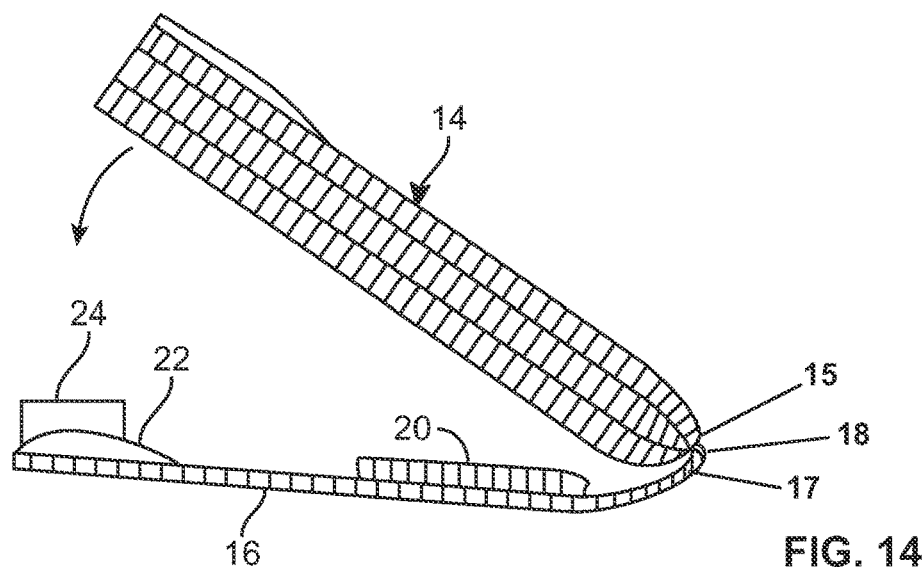
FIG. 14 is a side view of the cushion assembly of FIG. 13 depicted in its open configuration.
Figure 15:
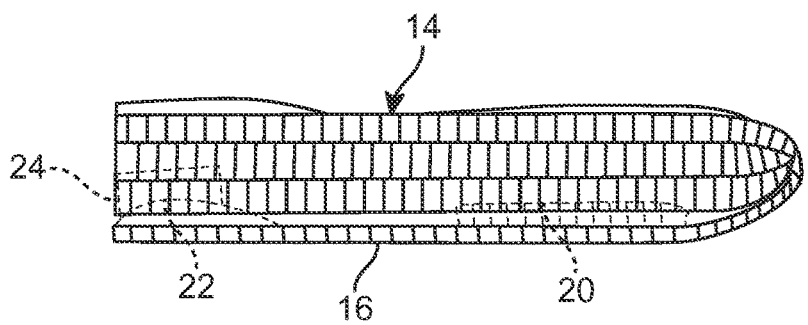
FIG. 15 is a side view of the cushion assembly of FIG. 13 depicted in its closed configuration.

In FIGS. 14 and 15, side views of the above described cushion assembly 12 in its open and closed configurations are shown in more detail.

Figure 16:
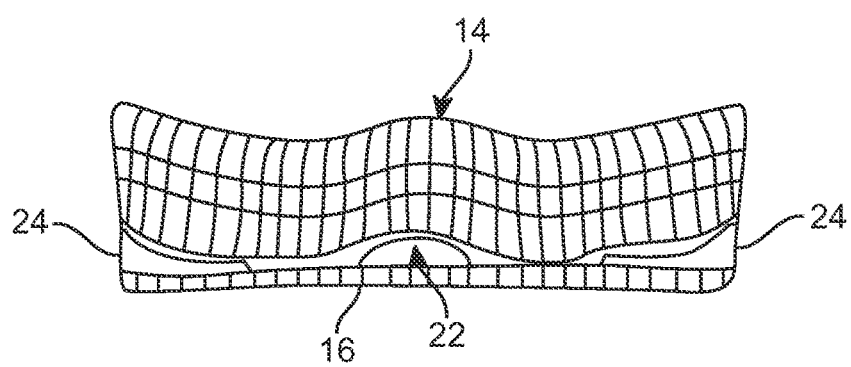
FIG. 16 is a frontal view showing the cushion assembly of FIG. 13 depicted in its closed configuration.

In FIG. 16 a frontal view is depicted in somewhat exaggerated perspective to emphasize the distortion of the cushion member 14 by the several underlying elements.

Figure 17:
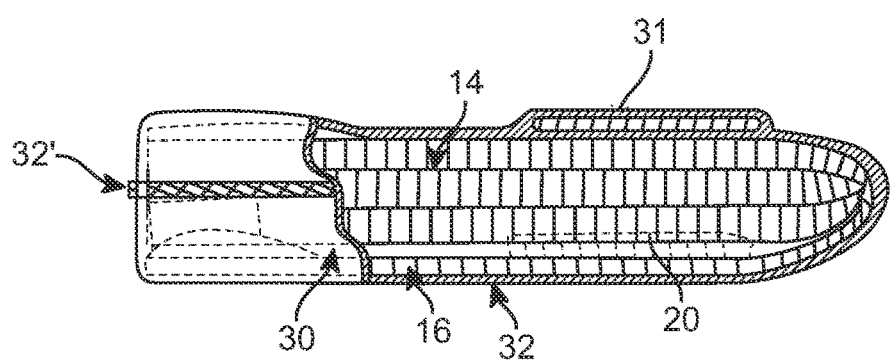
FIG. 17 is a partially broken side view showing the closed cushion assembly of FIG. 13 enveloped in its zippered cushion assembly cover depicted in FIG. 12.

In FIG. 17, a partially broken side view of the fully assembled anatomical support and seat cushion apparatus is shown further illustrating the cushion assembly 12 disposed within its fabric cover 30. Note that a closing zipper 31, 33 is provided around three sides of the lower edge of the cover, and a second, medially disposed expansion zipper and excess material facility 32 is suggested to accommodate an assembly of larger or smaller cushion deforming elements should that be necessary.

Figure 18:
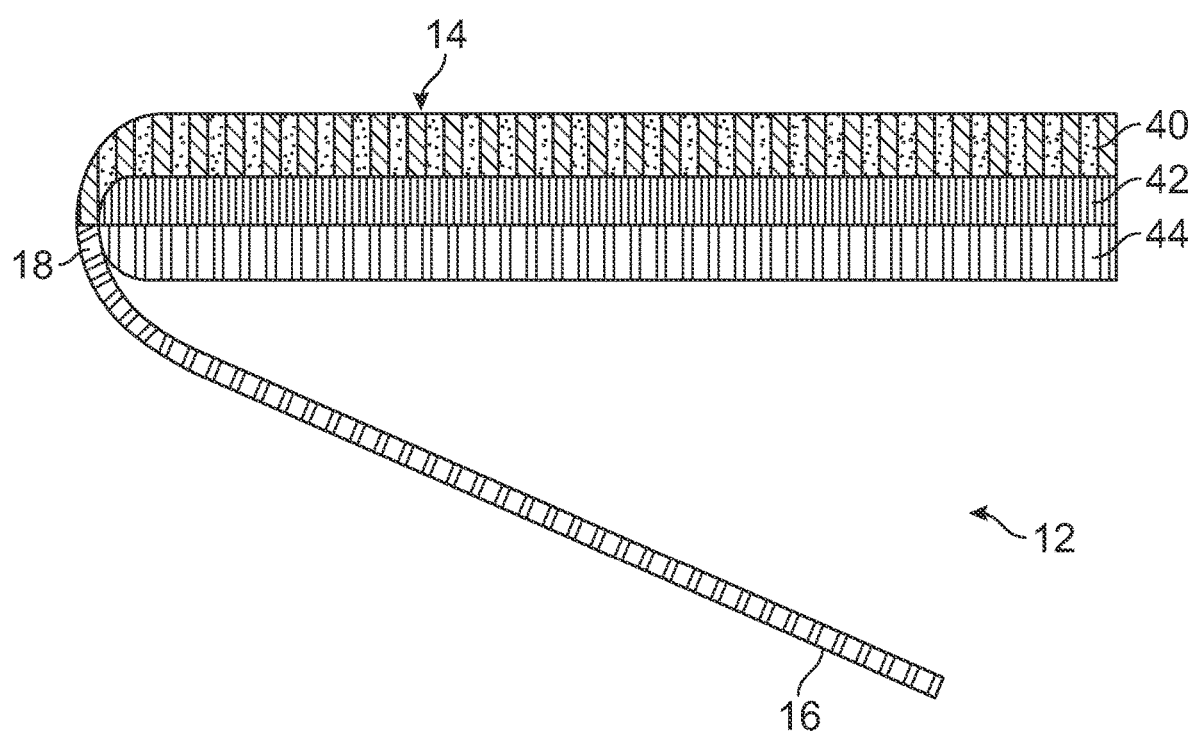
FIG. 18 is a side elevation view of an alternative embodiment of the user supporting cushion member and the pivotally attached base member of FIG. 13.
Figure 19:
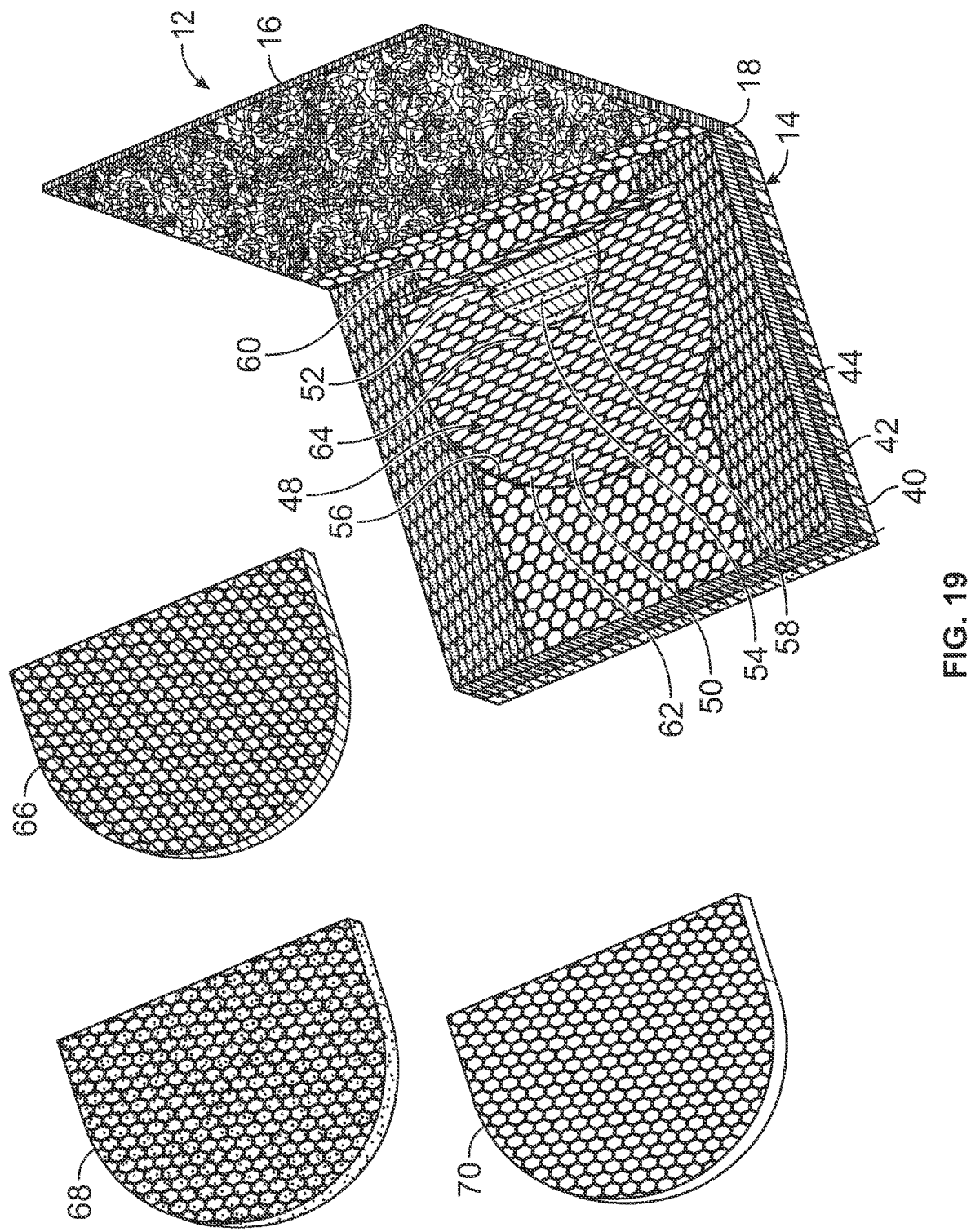
FIG. 19 is a perspective view of the user supporting cushion member and the pivotally attached base member of FIG. 18, with three ischial pads shown exploded therefrom.

FIGS. 18-20 show a modification to the cushion member 14 shown in FIG. 13. Each panel 40, 44 has a generally uniform height from its lower surface to its upper surface; the heights of the panels 40, 44 may be different and each may not have a uniform height. As described herein, the intermediate panel 42 has a height that varies from its lower surface to its upper surface. The thermoplastic elastomer honeycomb material of the upper panel 40 has a first hardness, the thermoplastic elastomer honeycomb material of the intermediate panel 42 has a second hardness, and the thermoplastic elastomer honeycomb material of the lower panel 44 has a third hardness. The thermoplastic elastomer honeycomb material of the upper panel 40 is softer than the thermoplastic elastomer honeycomb material of the intermediate panel 42, and the thermoplastic elastomer honeycomb material of the intermediate panel 42 is softer than the thermoplastic elastomer honeycomb material of the lower panel 44. That is, the lower panel 44 is more rigid than the intermediate panel 42, and the intermediate panel 42 is more rigid than the upper panel 40. As such, when a user sits onto top of the adjustable wheelchair seat cushion assembly 12, the buttocks of the user sink more easily than within the upper panel 40, than within the intermediate or lower panels 42, 44.

A pocket 48 is formed in the back-center portion of the cushion member 14. The pocket 48 extends completely through the lower panel 44 from the lower surface thereof to the upper surface thereof such that a portion 50 of the lower surface of the intermediate panel 42 is exposed when viewed from the lower surface of the cushion member 14. The pocket 48 has a side wall 56 formed by the lower panel 40, and an upper wall formed by the portion 50 of the lower surface of the intermediate panel 42. A pocket 52 extends from the pocket 48, and through the intermediate panel 42 from the lower surface thereof to the upper surface thereof such that a portion 54 of the lower surface of the upper panel 40 is exposed when viewed from the lower surface of the cushion member 14. The pocket 52 has a side wall 58 formed by the intermediate panel 42 and may further be formed by a portion of the lower surface of the intermediate panel 42 as described herein, and an upper wall formed by the portion 54 of the lower surface of the upper panel 44. The pockets 48, 52, are close to, but spaced from, the pivot or hinge means 18, and are separated from the pivot or hinge means 18 by a section 60 of at least the lower panel 44. In an embodiment, the intermediate panel 42 is not provided between the upper and lower panels 40, 44 in the section 60 such that the upper and lower panels 40, 44 are secured directly together, but a layer of the intermediate panel 42 can be provided. As shown, each pocket 48, 52 is generally semicircular, however, other shapes may be provided. The pocket 52 is smaller than the pocket 48.

In an embodiment, the intermediate panel 42 has a first portion 62 having a height that is generally uniform, and a second portion 64 having a height that gradually reduces from the first portion 62 to the side wall 58 of the pocket 52. The first portion 62 defines a generally planar lower surface and extends from the edges of the intermediate panel 42 to the second portion 64. A portion of the lower surface of the first portion 62 is exposed in the pocket 48 and forms the upper wall of the pocket 48. The second portion 64 surrounds the side wall 58 of the pocket 52 and forms part of the side wall 58. The lower surface of the second portion 62 is exposed in the pocket 48.

The pocket 48 may be left empty to provide first feel to the user/patient's ischial bone. Alternatively, one or more ischial pads 66, 68, 70 formed of a thermoplastic elastomer honeycomb material may be seated within the pocket 48 to vary the feel of the adjustable wheelchair seat cushion assembly 12 and to protect the user/patient's ischial bone. The one or more ischial pads 66, 68, 70 overlay the pocket 52. As shown, three ischial pads 66, 68, 70 of varying hardness are provided. The thermoplastic elastomer honeycomb material of the ischial pad 66 has a first hardness, the thermoplastic elastomer honeycomb material of the ischial pad 68 has a second hardness, and the thermoplastic elastomer honeycomb material of the ischial pad 70 has a third hardness. The thermoplastic elastomer honeycomb material of the second ischial pad 68 is harder than the thermoplastic elastomer honeycomb material of the first ischial pad 66, and the thermoplastic elastomer honeycomb material of the third ischial pad 70 is harder than the thermoplastic elastomer honeycomb material of the second ischial pad 66. That is, the third ischial pad 70 is more rigid than the second ischial pad 68, and the second ischial pad 68 is more rigid than the first ischial pad 66. Each ischial pad 66, 68, 70 has opposite planar sides and a perimeter shape that mirrors the shape of the wall of the pocket 48 such that the ischial pads 66, 68, 70 fit snugly within the pocket 48.

In an embodiment, each ischial pad 66, 68, 70 has a height from its upper surface to its lower surface that is less than the height of the pocket 48 such that when a single one of the ischial pads 66, 68, 70 is inserted into the pocket 48, the pocket 48 is not completely filled in the height direction. In the embodiment as shown, when all three ischial pads 66, 68, 70 are inserted into the pocket 48, the pocket 48 is completely filled in the height direction. The heights of the ischial pads 66, 68, 70 can be varied such so that the pocket 48 is filled in the height direction when two of the ischial pads are inserted therein, or so that the pocket 48 is filled in the height direction when three of the ischial pads are inserted therein. The ischial pads 66, 68, 70 may have the same heights or different heights.

When the seat cushion 14 is folded over onto the base member 16 (which may be populated with cushion deforming elements 20, 24 and 26) about the pivot or hinge means 18 to engage and lay upon the top of the cushion member 14, the pockets 48, 52 face the upper surface of the base member 16. The deforming elements 20, 22 and 24 are preferably not positioned underneath the pockets 48, 52. The ischial pads 66, 68, 70 are trapped between the seat cushion 14 and the base member 16 to secure the ischial pads 66, 68, 70 in place.

In embodiment, the base member 16 has a hardness which is harder than the hardness any of the panels 40, 42, 44. In an embodiment, the base member 16 has a hardness which is the same as the hardness of the lower panel 44.

The feel on the buttocks of the user/patient is varied depending upon whether, none, one, two or three ischial pads 66, 68, 70 are inserted into the pocket 48. In addition, two or more of the same hardness ischial pads can be inserted into the pocket 48. Upon at least initial insertion(s), the ischial pads 66, 68, 70 do not enter into/fill the pocket 52. When the user/patient's ischial bone is positioned thereabove, the user/patient's ischial bone can move into the pocket 52 and be protected.

Although embodiments of the present disclosure have been disclosed above, it will be appreciated that numerous alterations and modifications thereof will no doubt become apparent to those skilled in the art after having read the above disclosure. For example, the anatomical support cushions may be configured in any appropriate shape, with multiple panels and with various combinations of perforated and non-perforated core panels, and with core walls and/or face sheet perforations the number and/or hole size of which are tailored to achieve desired damping, cleaning and sanitizing characteristics. In addition, means other than the disclosed thermo-compression bead and closable cover can be provided for holding the several components in engaging relationship after the deforming elements have been attached to the base member and brought into deforming engagement with the cushion member. It is therefore intended that the following claims may be interpreted as covering all such alterations and modifications as fall within the true spirit and scope of the disclosure.

What is claimed is:

1. An adjustable anatomical support and seat cushion apparatus for wheelchairs, comprising:
 a base member formed of at least one layer of a thermoplastic honeycomb material;
  a resilient cushion member formed of an upper layer of thermoplastic honeycomb material, an intermediate layer of thermoplastic honeycomb material, and a lower layer of thermoplastic honeycomb material, the layers being bonded together, the upper layer is softer than the intermediate layer, and the intermediate layer is softer than the lower layer, the base member having an edge thereof pivotally attached to a corresponding edge of the cushion member at a hinge, the cushion member being rotatable between a non-parallel disposition relative to the base member and a parallel disposition relative to the base member, wherein the base member is disposed beneath the lower layer when the cushion member is in the parallel disposition relative to the base member, wherein a pocket is formed in the lower layer and has an open end facing the base member when the cushion member is in the parallel disposition relative to the base member; and
  at least one pad configured to be positioned within the pocket of the cushion member, the pad being removable from the pocket of the cushion member.

2. The adjustable anatomical support and seat cushion apparatus as defined in claim 1, wherein the at least one pad is formed of thermoplastic honeycomb material.

3. The adjustable anatomical support and seat cushion apparatus as defined in claim 2, wherein the at least one layer of thermoplastic honeycomb material of the base member is more rigid than the layers of thermoplastic honeycomb material of the cushion member.

4. The adjustable anatomical support and seat cushion apparatus as defined in claim 2, wherein first and second pads are provided, wherein the first pad is softer than the second pad.

5. The adjustable anatomical support and seat cushion apparatus as defined in claim 2, wherein first, second and third pads are provided, wherein the first pad is softer than the second pad, and the second pad is softer than the third pad.

6. The adjustable anatomical support and seat cushion apparatus as defined in claim 5, wherein the pocket is filled when all three pads are seated within the pocket.

7. The adjustable anatomical support and seat cushion apparatus as defined in claim 1, wherein first, second and third pads are provided, wherein the first pad is softer than the second pad, and the second pad is softer than the third pad.

8. The adjustable anatomical support and seat cushion apparatus as defined in claim 7, wherein the pocket is filled when all three pads are seated within the pocket.

9. The adjustable anatomical support and seat cushion apparatus as defined in claim 1, further comprising a pocket formed in the intermediate layer, wherein the pockets are open to each other.

10. The adjustable anatomical support and seat cushion apparatus as defined in claim 9, wherein the pocket formed in the intermediate layer is smaller than the pocket formed in the lower layer.

11. The adjustable anatomical support and seat cushion apparatus as defined in claim 1, wherein the at least one layer of thermoplastic honeycomb material of the base member is more rigid than the layers of thermoplastic honeycomb material of the cushion member.

12. The adjustable anatomical support and seat cushion apparatus as defined in claim 1, further comprising a cover removably disposed about the cushion member, the at least one pad, and the base member when the cushion member and the base member are in the parallel disposition.

13. The adjustable anatomical support and seat cushion apparatus as defined in claim 12, wherein the cover includes an opening configured to allow the cushion member, the pad, and the base member to be inserted into the cover, and a closure disposed about the opening and configured to allow the cushion member, the pad, and the base member to be closedly enveloped within the cover.

14. The adjustable anatomical support and seat cushion apparatus as defined in claim 1, further comprising at least one cushion deforming element configured to be affixed to a surface of the base member generally facing the lower layer, the at least one cushion deforming element being operative to engage and deform the lower layer when the cushion member is rotated from the non-parallel disposition relative to the base member into the parallel disposition relative to the base member, the at least one cushion deforming element being removable from the base member.

15. The adjustable anatomical support and seat cushion apparatus as defined in claim 14, further comprising a cover removably disposed about the cushion member, the pad, at least one cushion deforming element, and the base member when the cushion member and the base member are in the parallel disposition.

16. The adjustable anatomical support and seat cushion apparatus as defined in claim 1, wherein the hinge is thermo-compressively formed.

17. The adjustable anatomical support and seat cushion apparatus as defined in claim 1, wherein the pocket is proximate to, but spaced from, the hinge.

18. The adjustable anatomical support and seat cushion apparatus as defined in claim 17, further comprising a pocket formed in the intermediate layer, wherein the pockets are open to each other, the pocket formed in the intermediate layer being smaller than the pocket formed in the lower layer.

19. The adjustable anatomical support and seat cushion apparatus as defined in claim 18, wherein the pocket formed in the intermediate layer is not filled when the at least one pad is inserted into the pocket formed in the lower layer.

* * * * *